United States Patent
Maul et al.

(10) Patent No.: US 7,664,404 B2
(45) Date of Patent: Feb. 16, 2010

(54) MODULAR SYSTEM FOR AN OPTICAL REAR PANEL BUS

(75) Inventors: Jürgen Maul, Sulzbach-Rosenberg (DE); Herbert Reiss, Hahnbach (DE); Michael Staudt, Altdorf (DE); Thomas Völkel, Altdorf (DE)

(73) Assignee: Siemens Aktiengesellschaft, Munich (DE)

( * ) Notice: Subject to any disclaimer, the term of this patent is extended or adjusted under 35 U.S.C. 154(b) by 620 days.

(21) Appl. No.: 10/565,685

(22) PCT Filed: Jul. 13, 2004

(86) PCT No.: PCT/EP2004/007738

§ 371 (c)(1),
(2), (4) Date: Jan. 24, 2006

(87) PCT Pub. No.: WO2005/012973

PCT Pub. Date: Feb. 10, 2005

(65) Prior Publication Data

US 2006/0188265 A1 Aug. 24, 2006

(30) Foreign Application Priority Data

Aug. 1, 2003 (DE) .................... 103 35 036

(51) Int. Cl.
*H04B 10/00* (2006.01)

(52) U.S. Cl. .................. 398/164; 398/135; 398/69; 398/60; 385/89; 385/90; 385/92; 385/93

(58) Field of Classification Search ............... 398/58, 398/59, 69, 79, 82, 83, 86, 88, 89, 66, 67, 398/68, 70, 71, 72, 73, 135, 115, 118, 128, 398/130, 164, 60; 385/24, 37, 147, 47, 52, 385/14, 15, 34, 53, 89, 90, 92, 93
See application file for complete search history.

(56) References Cited

U.S. PATENT DOCUMENTS 4,856,091 A 8/1989 Taska
(Continued)

FOREIGN PATENT DOCUMENTS

DE 101 26 756 A1 1/2003
(Continued)

OTHER PUBLICATIONS

Sauter, G.F. "Gradient-Index Lens Optical Backplane", Applied Optics, Optical Society of America, Washington, US., vol. 33, No. 16, Jun. 1, 1994, pp. 3446-3453, XP000450238.
(Continued)

*Primary Examiner*—Hanh Phan

(57) ABSTRACT

The invention relates to a rear panel bus, with a number of plugs which may be plugged into the modules and a fibre optic cable, for guiding light signals, whereby the fibre optic cable has a number of interruptions in the propagation direction of the light signals, into which means, for injection and decoupling of light signals running in the fibre optic cable may be inserted. The interruptions in the fibre optic cable are arranged such that a plug may be allocated to an interruption. The invention further comprises a module which may be plugged into an optical rear panel bus and means for injection and decoupling of light signals running in an optical fibre cable whereby the means for injecting and decoupling are arranged such as to be able to be inserted in interruptions in the fibre optic cable, to decouple light signals from the fibre optic cable and to inject light signals into the fibre optic cable in the propagation direction.

4 Claims, 3 Drawing Sheets

U.S. PATENT DOCUMENTS

| | | | |
|---|---|---|---|
| 5,218,654 A * | 6/1993 | Sauter | 385/24 |
| 5,500,523 A * | 3/1996 | Hamanaka | 250/216 |
| 6,055,099 A * | 4/2000 | Webb | 359/435 |
| 6,263,132 B1 | 7/2001 | Shahid | |
| 6,853,768 B2 * | 2/2005 | Kibler et al. | 385/33 |
| 7,366,423 B2 * | 4/2008 | Levy et al. | 398/164 |
| 2002/0030809 A1 | 3/2002 | Saito et al. | |
| 2002/0181863 A1 | 12/2002 | Kibler et al. | |

FOREIGN PATENT DOCUMENTS

EP      1 079 252 A2      2/2001

OTHER PUBLICATIONS

Kenjiro Hamanaka, "Optical bus interconnection system using Selfoc lenses", Optics Letters, vol. 16, No. 16, Aug. 15, 1991, pp. 1222-1224.

* cited by examiner

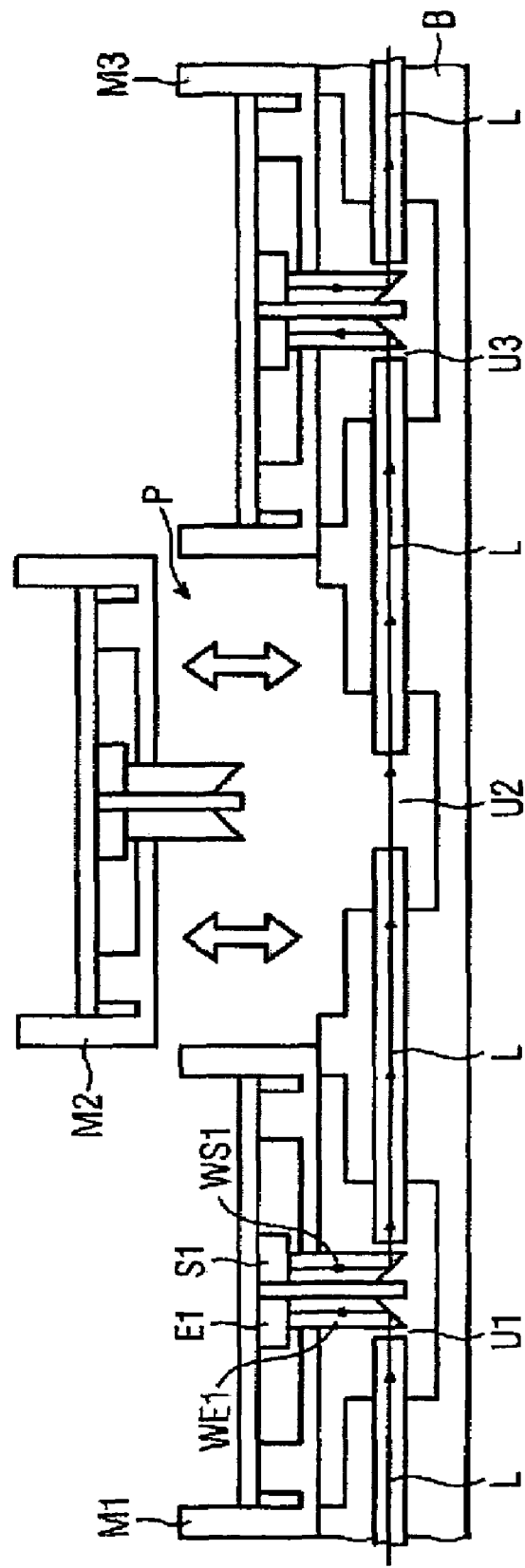

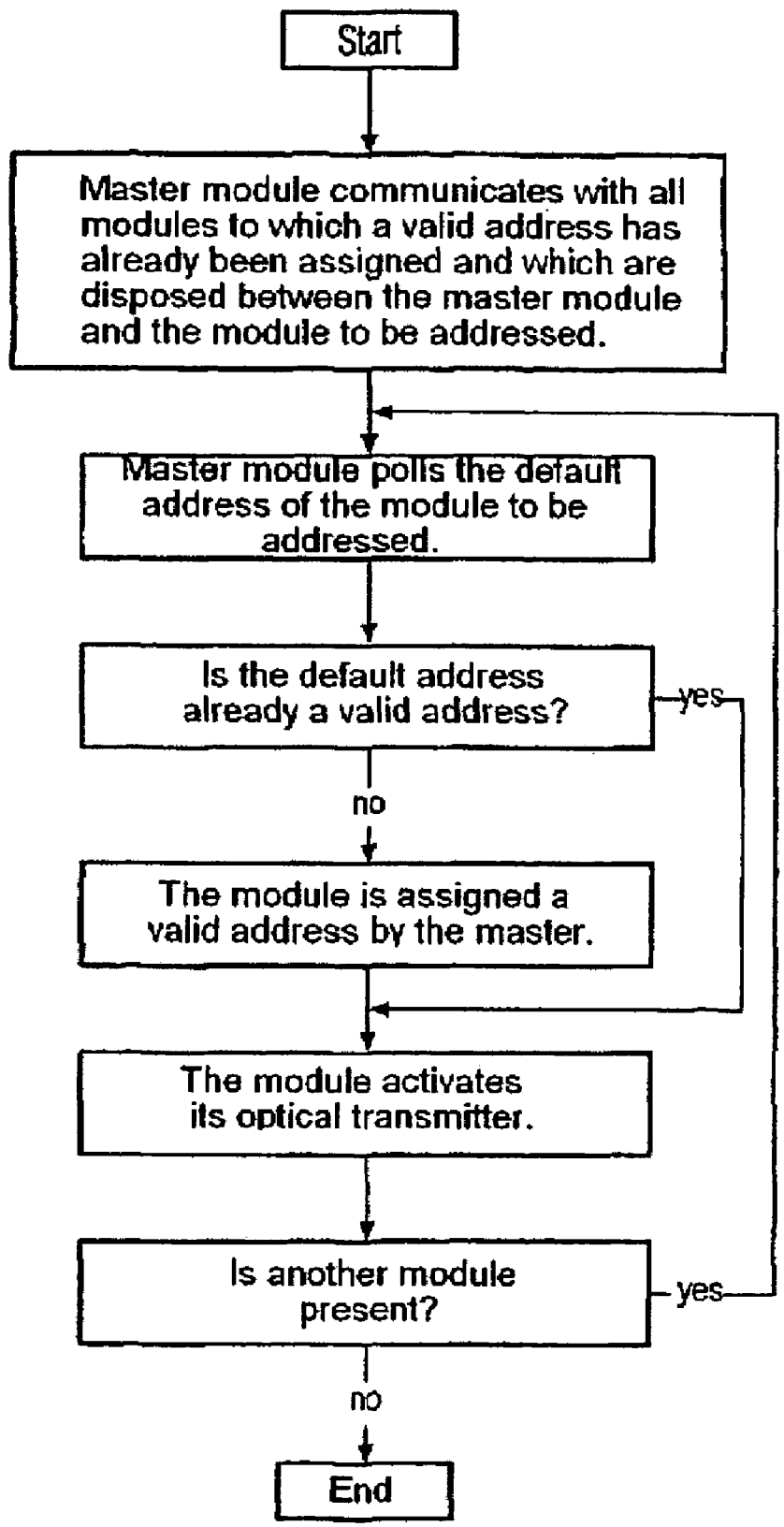

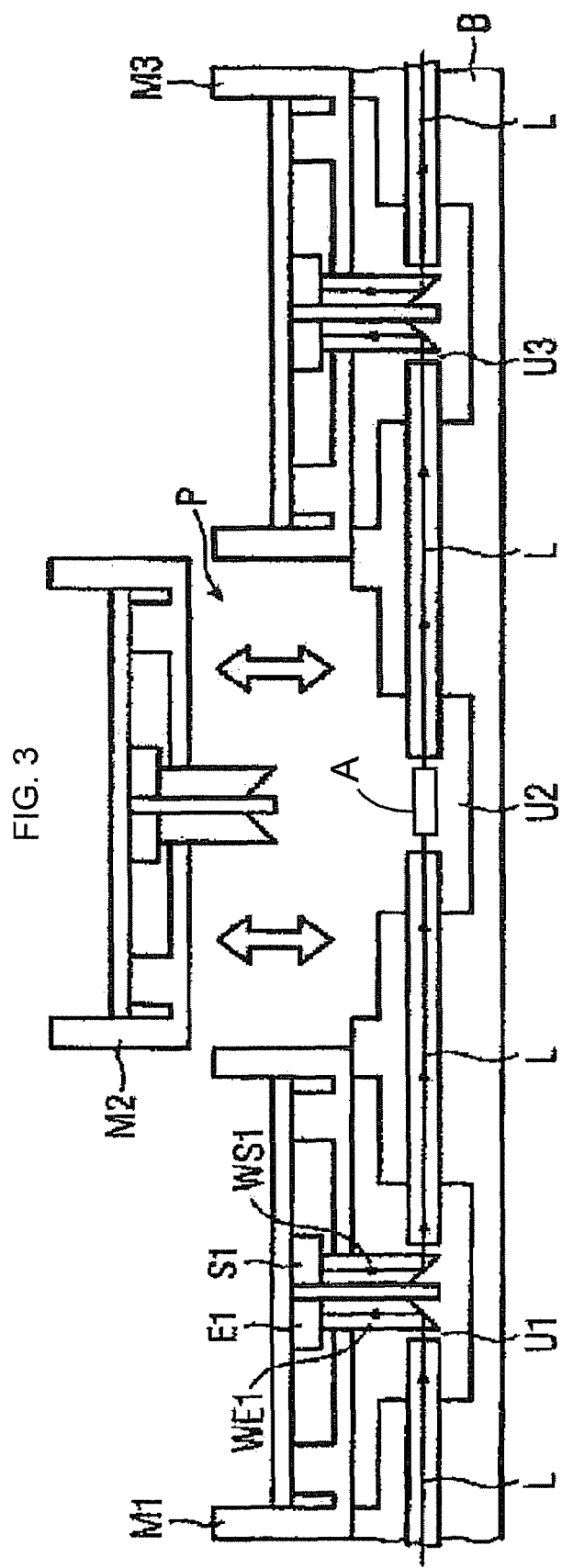

# MODULAR SYSTEM FOR AN OPTICAL REAR PANEL BUS

CROSS REFERENCE TO RELATED APPLICATIONS

This application claims priority to the German application No. 10335036.5, filed Aug. 1, 2003 and to the International Application No. PCT/EP2004/007738, filed Jul. 13, 2004 which are incorporated by reference herein in their entirety.

FIELD OF INVENTION

The present invention relates to a modular system regarding a rear panel bus.

BACKGROUND OF INVENTION

Modular systems consist of a number of modules interconnected via a backplane. For this purpose, the backplane has a number of slots into which the individual modules can be plugged in a modular manner. Generally the backplane provides the voltage supply for these individual modules via these slots. In addition, the slots are interconnected using appropriate electrical or optical media in such a way that the signals transmitted by one of the modules can be received by the other modules and vice versa, the transmitted and received signals containing information such as a code for addressing or also data for data communication between the modules.

EP 0 237 236 discloses the use of a backplane having an optical waveguide for data communication between the modules. For this purpose the optical waveguide has, at defined intervals along its length, appropriate means of coupling out portions of the light guided in the optical waveguide and allowing the rest of the light through. These coupled-out light portions additionally contain the complete information transmitted in the optical signals. The coupled-out light, and therefore the optical signals, are then guided to the individual modules via other optical elements such as lenses. Through this arrangement of the means in the optical waveguide, portions of the light remaining in the optical waveguide are thus repeatedly coupled out. Particularly if there are a large number of slots, the intensity of the light is therefore reduced more and more. This has the disadvantage that the farther modules in the propagation direction of the light receive the information contained in the coupled-out optical signals with ever lower optical intensity. As the number of modules increases, the signal-to-noise ratio continues to deteriorate, possibly resulting in defective information transmission.

WO 88/08573 also describes a modular system with a number of modules which are plugged into a backplane. The inserted modules can communicate with one another accordingly via the backplane. Each module additionally has an optical emitter and an optical receiver which are disposed in such a way that, in the inserted state, a module's optical emitter is always opposite the optical receiver of the immediately adjacent module. To address the modules, the first module then sends a code for a possible valid address via the backplane. The first module simultaneously activates its optical emitter. The optical receiver of the second module is therefore illuminated and activated via the free air interface between the first and the adjacent second module. The activated optical receiver then enables the code transmitted via the backplane for further processing on the second module. When this second module has adopted the code of the valid address, it activates its optical emitter. The latter in turn illuminates the optical receiver of the following third module via another air interface, and so on. This kind of series connection of modules for addressing is known as "daisy chaining". The arrangement shown in WO 88/08573 has the disadvantage, however, that further optical emitters and receivers in addition to the backplane are necessary for addressing.

SUMMARY OF INVENTION

An object of the present invention is therefore to provide a modular system regarding a rear panel bus which allows for easy data communication and auto addressing via a common medium.

This object is achieved by the claims.

By the optical waveguide of a backplane having breaks, and means of coupling light into and out of the pluggable modules being insertable into these breaks, optical signals guided in the optical waveguide can be diverted via said means to the inserted modules, i.e. coupled out of the optical waveguide. In particular, the module detects information contained in the diverted optical signal, such as the code for addressing or the data for data communication. Corresponding optical signals generated by the module are returned to the optical waveguide via the means for coupling light in and out, i.e. they are coupled into the optical waveguide in the propagation direction of the original optical signals. Due to the fact that the breaks are disposed in such a way that a break can be assigned to a slot on the backplane, simple daisy chaining of a number of modules plugged into a backplane is possible. Inserted modules can therefore be addressed straight away and data for data communication can then be exchanged via the same medium, i.e. the optical waveguide. As a result, there is no need for separate media for addressing and data communication.

Further advantageous embodiments and preferred developments of the invention are set out in the dependent claims.

BRIEF DESCRIPTION OF THE DRAWINGS

The present invention and its advantages will now be described in greater detail with reference to the following figures, in which:

FIG. 1 shows a possible embodiment of the modular system comprising a backplane and three modules, FIG. 2 shows flowcharts for the basic sequence for addressing the modules FIG. 3 shows an embodiment of the modular system where an attenuating element is inserted within a break which is unoccupied by a module;

DETAILED DESCRIPTION OF INVENTION

The part of a modular system shown in FIG. 1 has a backplane B with an optical waveguide L. In the present embodiment, the optical waveguide L guides corresponding optical signals from the left- to the right-hand side of the backplane B, thereby defining the propagation direction of the guided light for this optical waveguide L. According to the present invention, the optical waveguide L has a number of breaks U1, U2 and U3. If no module is inserted, as in the case of break U2, for example, the guided light or optical signals leave the optical waveguide L at an interface between optical waveguide L and break U2, will overcome the break U2 according to the specified propagation direction and re-enter the waveguide L at the other interface. In order to minimize the losses at the interfaces, particularly the reflection losses, appropriate anti-reflection coatings are preferably applied to these interfaces.

On the backplane B there is provided a plurality of slots, such as the slots P shown in FIG. 1. The slots P are implemented in such a way that a stable mechanical or also an additional electrical connection exists between backplane B and the modules M1, M2 and M3 inserted therein. According to the present invention, the modules M1, M2 and M3 additionally have means of coupling the optical signals into and out of the optical waveguide L. If, as shown in this example, the modules M1 and M3 are plugged in, the corresponding means are inserted in the breaks U1 and U3. The optical signals guided in the optical waveguide L are then fed, e.g. at the module M1, to an optical receiver E1. The latter converts the received optical signal into an electrical signal for further processing on the module M1. There is additionally provided on the module an optical emitter S1 which generates optical light signals which are then coupled into the optical waveguide L of the backplane B via the means of coupling light in and out, these means preferably being implemented in such as way that they consist of a first (WE1) and a second (WS1) optical waveguide section which are disposed parallel to one another. In one version, as shown in FIG. 1, there is additionally provided between the two parallel optical waveguide sections WE1 and WS1 another barrier which optically isolates the two optical waveguide sections WE1 and WS1 from one another. The two optical waveguide sections have an oblique end face at one end, both optical waveguide sections being implemented or disposed in such a way that they couple out the optical signals guided in the optical waveguide L and then couple optical signals in again in the propagation direction. Taking the example of the first module M1 shown in FIG. 1, this means that the first optical waveguide section WE1 projects into the break U1 of the waveguide L in such a way that the optical signals coming from the left leave the optical waveguide L at the interface, then enter the first optical waveguide section WE1, are reflected at its oblique end face and are then guided from the first optical waveguide section WE1 to the optical receiver E1 of the module M1. The oblique end face is implemented in such a way that that the optical signals entering the first optical waveguide section WE1 are totally reflected at its end face. Correspondingly, the optical signals generated by the optical emitter S1 are guided in the second waveguide section WS1, reflected at its oblique end face and coupled into the optical waveguide L at its next interface at the other end of the break U1 in the propagation direction. This means that the optical signal generated on the module M1 and coupled back into the optical waveguide L after the break U1 has the same propagation direction in the optical waveguide L as the original signal guided in the optical waveguide before the break U1. The coupled-in optical signals are then passed on via the optical waveguide L and the break U2 to the break U3. At the break U3 the optical signals are then coupled out via the means provided in the inserted module M3, and so on. This provides a simple method of daisy chaining a plurality of modules M1 and M3 which are plugged into a backplane B in a modular system. Accordingly, using the optical waveguide L, the information about the codes for autoaddressing and/or the data for data communication can be transmitted via the same medium, namely the optical waveguide L.

The embodiment shown in FIG. 1 permits the guiding of light, or of the information contained in the guided light signals, in one propagation direction, namely from the module M1 on the left-hand side to the module M3 on the right-hand side. For bidirectional transmission of optical signals, there must be provided on the backplane B correspondingly a second optical waveguide according to the present invention and modules with correspondingly further means for coupling optical signals into and out of this second optical waveguide. This means that optical signals and therefore codes and data can be guided in either direction, thereby enabling the modules M1 and M3 to communicate with one another in both directions.

The breaks U1, U2 and U3 of the optical waveguide L of the modular system are preferably implemented in such a way that their dimensions are only slightly larger than the dimensions of the insertable means of coupling light in and out in the propagation direction of the optical signals. This obviates the need for direct contact of the optical waveguide L with the corresponding means for coupling light in and out, particularly when inserting or withdrawing the modules. Such unintentional mechanical contacts can damage the surfaces of the optical waveguides L, WE1 or WS1, particularly the interfaces, thereby reducing the transmission characteristics and therefore the intensity of the guided optical signals in the longer term. Nor, on the other hand, should the dimensions be selected too large, as this results in additional unnecessary attenuations in the spare-remaining regions of the breaks U1, U2 and U3.

By means of the daisy chaining of modules M1, M2, M3, . . . effected according to the invention, the optical signals coupled out of the optical waveguide L are converted into corresponding electrical signals by an optical receiver on a module and an optical emitter is then controlled as a function of these electrical signals. This means, for example, that the optical signals received by the module M1 and the information contained therein are converted by the optical receiver E1 into electrical signals and then amplified. These amplified electrical signals are then reconverted into optical signals in the emitter S1, then coupled into the optical waveguide L and guided from it to the next inserted module M3. This ensures, even with a large number of modules inserted, that the intensity of the optical signals is sufficiently high even at the last module in the chain.

If the magnitude of the signal gain and the attenuation is known for the guided optical signals in the optical waveguides L, WE1, WS1, . . . and the breaks U1, U2, U3, . . . , it is possible to identify, using an intensity measurement on following modules in the chain, how many modules are not inserted. As illustrated in the embodiment of FIG. 3, which is similar to the embodiment of FIG. 2, and includes an attenuating element (A) with a defined attenuation which is inserted in the breaks U2 which are not occupied by modules M1, M2, M3, such that available slots P can be more reliably determined on the basis of the intensity measurement.

Modular systems such as automation systems consist of a number of modules each performing predefined tasks or functions, one of the modules, e.g. a head unit, generally being the master for the other inserted modules. All the modules are supplied with appropriate voltages via the backplane. To ensure that the modules interoperate, an address must be assigned to all the modules of the automation system during planning. During operation, the master then first checks whether valid addresses have been assigned to the individual modules in order then to supply them accordingly with data or control them on the basis of this code. The basic addressing sequence will now be described in greater detail with reference to the flowchart shown in FIG. 2. The sequence illustrated can be used both for a restart, i.e. when the modular system is started up, but also for changing or adding modules, it being assumed that a default address is assigned to each module after voltage restoration and that its optical emitter is deactivated. The master will communicate with the modules at regular intervals via the optical waveguide L and check whether a valid address has been assigned to them. If a module is detected which interrupts the series, i.e. whose optical emitter is deactivated, the master polls the default address of this module. If the default address is already a valid address because, for example, this address has not been assigned to any other module, the optical emitter of this module is activated. If, on the other hand, the default address is not a valid address, this module is assigned a valid address by the master module via the optical signals guided in the optical waveguide. And its optical emitter is activated, thereby enabling the master to communicate with the following module via the optical waveguide L, the first optical waveguide section WE1, the optical receiver E1 and the optical emitter S1 connected thereto, the second optical waveguide section WS1 and the optical waveguide L. If another module is present which also breaks the chain, its default address is in turn polled, and so on. This means that it is possible to incorporate individual or even a plurality of newly connected modules. When the system is restarted, all the modules have a default address so that here the steps must then be performed on the first module following the master. If a valid address has been assigned to all the modules, addressing can be terminated and data communication e.g. to control the modules can commence. Preferably, all the modules assume a parallel mode for this purpose, i.e. all the modules receive data virtually simultaneously, but only the module possessing the address assigned to the data responds or executes.

The invention claimed is:

1. A modular system, comprising:
   a rear panel bus having:
      a plurality of slots configured to accommodate plug-in modules;
      an optical waveguide for guiding optical signals, the optical waveguide having a number of breaks relative to a propagation direction of the optical signals, each break assigned to one of the slots; and
   a plurality of modules plugged into the slots, each module including a coupling unit for coupling the optical signals to the respective module, wherein
   a dimension of the breaks is only slightly larger than a dimension of the coupling units relative to the propagation direction,
   each coupling unit comprises first and second optical waveguide parts,
   one end of the first optical waveguide part has an oblique end face for completely coupling out the optical signals from the optical waveguide,
   one end of the second optical waveguide part has an oblique end face for coupling the optical signals into the waveguide in the propagation direction, the optical signals transmitted by an optical emitter arranged on the respective module,
   wherein the modular system is an automation system, one of the inserted modules is configured as a master module for the remaining modules,
   and wherein the master module is configured for communication and to check via the optical waveguide if a valid address has been assigned to the remaining modules.

2. The modular system according to claim 1, wherein the dimension of the breaks essentially equals the dimension of the coupling units relative to the propagation direction.

3. The modular system as claimed in claim 1, further comprising attenuating elements configured to be inserted into the breaks, wherein a dimension of the attenuating elements is slightly smaller than the dimension of the breaks, and the attenuating elements have a specific attenuation for the optical signals.

4. The modular system as claimed in claim 3, wherein the dimension of the attenuating elements essentially equals the dimension of the breaks.

* * * * *

UNITED STATES PATENT AND TRADEMARK OFFICE
CERTIFICATE OF CORRECTION

PATENT NO.      : 7,664,404 B2                                    Page 1 of 1
APPLICATION NO. : 10/565685
DATED           : February 16, 2010
INVENTOR(S)     : Maul et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1008 days.

Signed and Sealed this

Thirtieth Day of November, 2010

David J. Kappos
*Director of the United States Patent and Trademark Office*